(12) United States Patent
Carannante et al.

(10) Patent No.: US 8,924,638 B2
(45) Date of Patent: Dec. 30, 2014

(54) METADATA STORAGE ASSOCIATED WITH WEAR-LEVEL OPERATION REQUESTS

(71) Applicant: Micron Technology, Inc., Boise, ID (US)

(72) Inventors: Procolo Carannante, Monte di Procida (IT); Angelo Di Sena, Castello di Cisterna (IT); Fabio Salvati, Montoro Inferiore (IT); Giuseppe Ferrari, Naples (IT); Anna Sorgente, Marigliano (IT)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 13/857,943

(22) Filed: Apr. 5, 2013

(65) Prior Publication Data

US 2013/0227206 A1 Aug. 29, 2013

Related U.S. Application Data

(63) Continuation of application No. 12/939,953, filed on Nov. 4, 2010, now abandoned.

(51) Int. Cl.
*G06F 12/00* (2006.01)
*G06F 12/02* (2006.01)

(52) U.S. Cl.
CPC .... *G06F 12/0246* (2013.01); *G06F 2212/7207* (2013.01)
USPC .................................. 711/103; 711/E12.008

(58) Field of Classification Search
CPC .................... G06F 12/0246; G06F 2212/7207
USPC .......................................................... 711/103
See application file for complete search history.

(56) References Cited

U.S. PATENT DOCUMENTS

| | | |
|---|---|---|
| 2007/0136509 A1 | 6/2007 | Agami |
| 2009/0103364 A1* | 4/2009 | Pekny et al. ............. 365/185.17 |
| 2010/0011152 A1 | 1/2010 | Yu et al. |
| 2010/0037005 A1 | 2/2010 | Kim et al. |
| 2010/0122015 A1* | 5/2010 | Fusella et al. ................. 711/103 |
| 2010/0169543 A1 | 7/2010 | Edgington et al. |
| 2010/0229005 A1* | 9/2010 | Herman et al. ............... 713/193 |
| 2010/0293317 A1 | 11/2010 | Confalonieri et al. |
| 2010/0318718 A1 | 12/2010 | Eilert et al. |
| 2012/0023365 A1* | 1/2012 | Byom et al. ................. 714/6.13 |
| 2012/0030409 A1 | 2/2012 | Post et al. |

OTHER PUBLICATIONS

Micron Technology, Inc., "NAND Flash Translation Layer (NFTL) 4.5.0. User Guide," 2010, 40 pages.

* cited by examiner

*Primary Examiner* — Aracelis Ruiz
(74) *Attorney, Agent, or Firm* — Knobbe, Martens, Olson & Bear LLP

(57) ABSTRACT

A method includes responding to a wear-level operation request by copying data from a first portion of a first memory array to a second portion of the first memory array, and copying metadata associated with the data from a third portion of a second memory array to a fourth portion of the second memory array. The first memory array includes a NAND or NAND-based memory array, and the second memory array includes non-volatile memory including at least one of the group consisting of: phase-change memory, EEPROM, and NOR flash memory.

28 Claims, 8 Drawing Sheets

US 8,924,638 B2

METADATA STORAGE ASSOCIATED WITH WEAR-LEVEL OPERATION REQUESTS

CROSS-REFERENCE TO RELATED APPLICATIONS

This application is a continuation of U.S. patent application Ser. No. 12/939,953, filed Nov. 4, 2010, which is incorporated in its entirety by reference herein.

BACKGROUND

1. Field of the Application

Subject matter disclosed herein relates to storing information via a flash translation layer.

2. Description of the Related Art

Electronic devices may include a NAND flash translation layer (FTL) between a file allocation table (FAT) file system, for example, and NAND-based flash memory, such as NAND or OneNAND™, available from Samsung Electronics of Hwasung-City, Gyeonggi-Do, Korea. FTL may comprise a software sector manager to enable operation of NAND flash memory using standard FAT-based file systems. Such an FTL may include an application program interface (API), for example. Non-volatile memories such as NAND flash may store data or code without the need for a constant source of power. This capability is useful for portable applications such as digital cameras, MP3 players, PDA's, and data storage in mobile phones, for example. However, flash technology may require particular software to manage data. For this reason, FTL software may perform operations to manage embedded flash memory devices. With FTL software, a user need only use relatively simple file system commands to interact with a NAND flash memory device, for example.

BRIEF DESCRIPTION OF THE DRAWINGS

Non-limiting and non-exhaustive embodiments will be described with reference to the following figures, wherein like reference numerals refer to like parts throughout the various figures unless otherwise specified.

DETAILED DESCRIPTION

Figure 1:
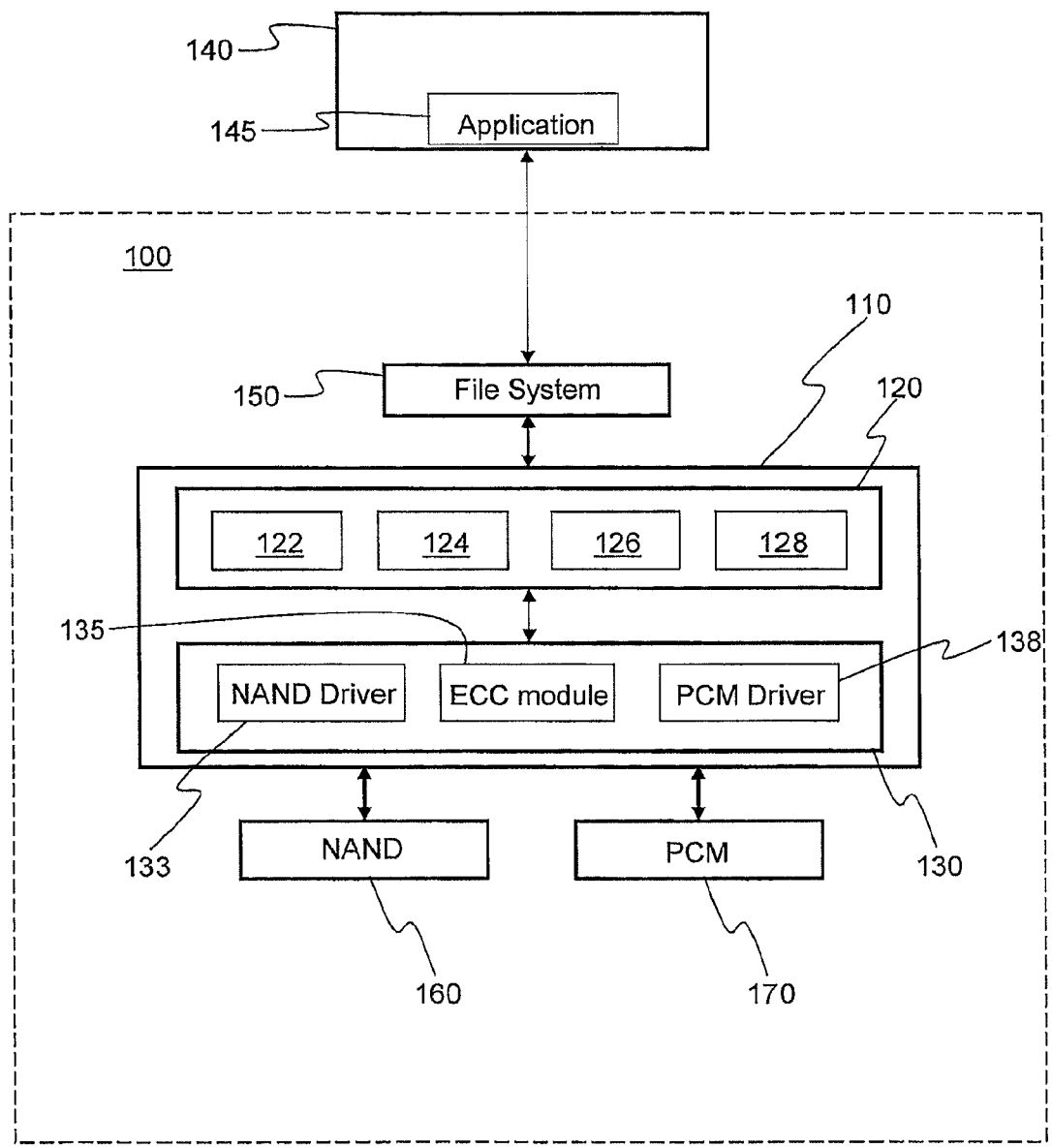
FIG. 1 is a schematic view of a hardware/software structure, according to an embodiment.

Reference throughout this specification to "one embodiment" or "an embodiment" means that a particular feature, structure, or characteristic described in connection with the embodiment is included in at least one embodiment of claimed subject matter. Thus, the appearances of the phrase "in one embodiment" or "an embodiment" in various places throughout this specification are not necessarily all referring to the same embodiment. Furthermore, the particular features, structures, or characteristics may be combined in one or more embodiments.

In an embodiment, a NAND flash translation layer (FTL) may be used to at least partially manage operations of NAND or NAND-based devices, such as OneNAND™ device. Such a OneNAND™ device may comprise a memory that includes one or more NAND devices and is capable of exporting a different memory interface, such as a NOR-like interface, for example. An FTL may be included in a memory controller or a micro-controller, for example, or may comprise a portion of an operating system or may be distributed as a software stand alone component. For example, an application may generate commands and/or addressing suitable for a hard disk drive or other memory device. A NAND FTL may translate such commands and/or addressing to be suitable for NAND flash memory. In an implementation, a process of translating such commands and/or addressing and performing a write operation of information to a NAND memory, for example, may result in generating metadata, error correction code (ECC), and/or markers associated with the information. Accordingly, the information may be written to one portion of NAND memory and metadata, error correction code (ECC), and/or markers associated with the information may be written to another portion of NAND memory. In a particular example, the information may be written to a main area of NAND memory and metadata, error correction code (ECC), and/or markers associated with the information may be written to a spare area of the NAND memory.

In one implementation, a relatively large portion of operations performed by NAND FTL may comprise operations to access (e.g., read/write) spare area of flash memory. A duration of time spent accessing memory may be referred to as busy time. Busy time to access memory in spare area of NAND flash memory may be substantially the same as time to access memory in a main area of NAND flash memory. Thus, NAND FTL may spend a relatively large amount of time accessing memory in a spare area of NAND memory to read/write metadata, error correction code (ECC), and/or markers, for example. Embodiments included herein describe techniques to improve performance of NAND FTL and flash memory by writing metadata and/or markers to a memory type other than NAND, as described in detail below. Such other type of memory may have faster access times, at least for relatively small amounts of information (such as the case for metadata and/or markers, for example) to be read or written, than NAND memory. Herein, examples describe such other type of memory as comprising phase change memory (PCM), though it is understood that claimed subject matter is not limited to PCM. For example, other types of memory that may be used to write metadata and/or markers may comprise nonvolatile memory such as NOR flash, cell trap NAND flash, EEPROM, and so on. In particular embodiments, writing information to NAND memory and to PCM may be performed in parallel or concurrent operations to further improve performance of flash FTL and flash memory.

In an embodiment, a process to operate NAND flash memory may include receiving a write request via a FTL to store information in a NAND memory array. Such information may be associated with metadata, which may be descriptive of one or more locations where the information is to be stored in the NAND memory array. For example, metadata may comprise sector numbers, virtual block addresses, error correction code (ECC), bad block markers, and so on. In one implementation, such metadata may be written to a type of nonvolatile memory other than NAND memory. In particular, such other type of nonvolatile memory may be selected to have faster read/write speeds than NAND memory, at least for reading/writing relatively small amounts of information, as discussed in detail below. PCM is one example of such memory. Thus, information to be stored in NAND memory may have associated metadata that may be stored in another type of nonvolatile memory. In one particular implementation, a process to store information in NAND memory may be performed at the same time as a process to store associated metadata in another type of nonvolatile memory. An ability to concurrently perform such processes may result in NAND memory showing faster write-speeds. In another particular implementation, ECC of the information may be written to a spare area of NAND memory while other metadata may be written to another type of a nonvolatile memory device.

In one embodiment, a process such as that described above may involve a memory device comprising a NAND memory array to store information associated with a write request received via a FTL, and a nonvolatile memory being another type of memory than the NAND memory array. Such other type of memory may store metadata of the information. Such a FTL may write information in a main area of a NAND memory array and write metadata in a nonvolatile memory in a parallel process, for example. In an implementation, such a nonvolatile memory may comprise PCM. Of course, details of such a memory device and processes of operating such a memory device are merely examples, and claimed subject matter is not so limited.

Embodiments, such as those described above, may allow for improved performance of storing information in NAND memory by using PCM to store metadata. Though such embodiments may incorporate PCM, merely a relatively small amount of a PCM array may be used to store metadata. For example, less than four megabytes of PCM may be used for every one gigabyte of information to be stored in NAND memory, though claimed subject matter is not limited in this respect.

In an implementation, information may be stored in multi-level cell (MLC) devices such as NAND flash. Such MLC devices may allow a limited number of times that memory array sectors or pages in the MLC devices may be programmed between two erase operations. Such a limited number of times, or number of operations (NOP), may be merely one. Such a device may then be referred to as a NOP1 device, for example. In one implementation, the number of program operations on a sector or page between erase operations need not be limited, thus allowing for a relatively easy and more efficient algorithm to ensure power loss data safety as part of a power loss recovery capability. For example, such a power loss recovery capability may help to ensure that an unexpected power loss need not corrupt already-written data in a memory system while also helping to ensure that the memory system may operate correctly at a next power on event. In an implementation, techniques to provide such a power loss recovery capability may include writing markers and/or commits separately from data itself. Some NAND or NAND-based devices may have a constraint related to the number of writes on a page between two block erase operations (e.g., NOP1 devices). Accordingly, such devices may not be power loss safe by themselves. Moving such markers and/or commits to a PCM may overcome such a constraint, providing power loss recovery also for NOP1 devices (such as for MLC devices).

FIG. 1 is a schematic view of hardware/software structure 100, according to an embodiment. Such a memory system may be operatively connected to a processor 140 hosting one or more applications 145, for example. Such applications may initiate commands to access NAND memory 160 and/or PCM 170 to write and/or read information via FTL 110. In one implementation, processor 140 may transmit/receive such commands to/from a file system 150. In such a case, file system 150 may comprise a computer file system architecture to provide a method of storing and/or organizing computer files and information stored in the computer files. For example, file system 150 may be used to organize computer files into a database for storage, organization, manipulation, and/or retrieval by processor 140. FTL 110 may comprise a NAND FTL to at least partially manage operations of NAND memory 160 and/or PCM 170. For example, applications 145 may generate commands and/or addressing suitable for addressing a hard disk drive (not shown) or other memory device. FTL 110 may translate such commands and/or addressing to be suitable for NAND flash memory 160 and/or PCM 170.

In a particular implementation, FTL 110 may include a flash abstraction layer (FAL) 120 and a hardware adaptation layer (HAL) 130. For example, FAL 120 may provide a relatively high-level abstraction of the physical organization of NAND memory 160, emulating rewriting of memory sectors in hard disks by remapping new data to another location in the NAND memory array and marking a previous sector invalid. In addition, FAL 120 may perform one or more operations to maintain integrity of NAND memory 160. For example, FAL 120 may comprise bad block management (BBM) module 122, wear-leveling module 124, garbage collection module 126, and translation module 128, for example. BBM module 122 may determine whether memory blocks in NAND memory 160 are bad and may hide such bad blocks from FAL 120 to prevent the FAL from accessing them. Bad blocks may comprise blocks of NAND memory that contain one or more invalid bits whose reliability is not guaranteed. Bad blocks may be present at the time a NAND memory is manufactured and/or shipped, or bad blocks may develop during the lifetime of the NAND memory, for example.

Wear-leveling module 124 may monitor and spread the number of write cycles per block. Such a wear-leveling process may be useful for NAND memory, which may be programmed or erased reliably a limited number of times. Memories not involved with a wear-leveling algorithm may comprise blocks that are used at different rates. For example, blocks with relatively long-lived, static data need not endure as many write cycles as blocks involved with frequently-changed data. Wear Leveling module 124 may ensure that a NAND memory array is used substantially uniformly by monitoring and evenly distributing the number of erase cycles per block. Thus, for example, if a block is requested by translation module 128, the wear leveling module 124 may allocate a least used block, though claimed subject matter is not so limited.

FAL 120 may emulate rewriting sectors in hard disks by remapping new information to another location of a NAND memory array and marking a previous sector invalid. After some time, it may be necessary to free some invalid memory space to further allow new information to be written. To do this, FAL 120 may implement garbage collection module 126, which may copy valid sectors of NAND memory into a new free area while erasing information in the old area. Translation module 128 may provide translation from virtual to physical addresses and convert logical operations into physical operations on NAND memory 160. Translation module 128 may also handle exporting of operations available on storage media (e.g., write sector, read sector and format partitioning).

As mentioned above, FTL 110 may include a hardware adaptation layer (HAL) 130 to manage hardware functions of NAND memory 160 and/or PCM 170. For example, in one implementation, HAL 130 may comprise, among other things, a NAND driver 133 and a PCM driver 138. In other implementations, HAL 130 need not include a PCM driver if, for example, other types of memory are used in hardware/software structure 100. HAL 130 may also include ECC module 135 to detect and/or correct a particular number of errors in information to be written to or read from NAND memory 160. ECC module 135 may encode such information to allow the ECC module to identify and/or correct errors in the information. In a particular example, if ECC module 135 does not correct one or more errors successfully, FAL 120 may return a message to processor 140 indicating that an operation has failed. As an illustrative example, ECC module 135 may implement ECC code to allow for correction of 1-bit errors and/or to detect 2-bit errors for every 512 bytes of information.

Figure 2:
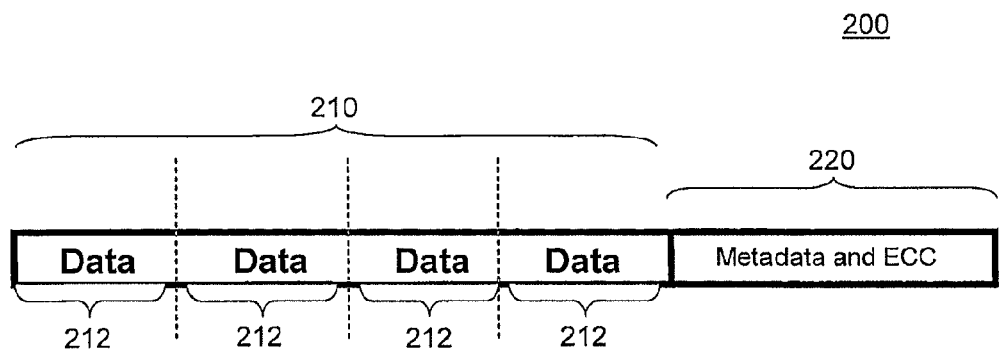
FIG. 2 is a schematic view of a memory structure, according to another embodiment.

FIG. 2 is a schematic view of a NAND memory structure 200, according to an embodiment. For example, NAND memory 160 shown in FIG. 1 may comprise NAND memory structure 200, though claimed subject matter is not so limited. NAND memory structure 200 may be partitioned into a main memory area 210 and a spare memory area 220. NAND memory structure 200 may comprise NAND flash memory. NAND memory structure 200 may comprise a user-addressable memory space including such main and spare memory areas and/or one or more other memory areas, which may or may not be contiguous with one another, and may or may not reside on a single device. Main memory area 210 and spare memory area 220 may comprise independent addressable spaces that may be accessed by read, write, and/or erase processes, for example. In one implementation, main memory area 210 may comprise one or more sectors 212 of memory to store information. For example, such sectors may have a capacity to store two kilobytes of information, though claimed subject matter is not so limited. For NAND memory, information may be written a sector at a time. Spare memory area 220 may be used to store metadata and/or ECC associated with information written to main memory area 210. In a particular example, such metadata and/or ECC may have a size of about twenty bytes for every two kilobytes of information (e.g., a size of a sector). In one implementation, metadata and/or ECC may be written to spare memory area 220 in a same operation (e.g., at the same time) that information is written to main memory area 210. On the other hand, in another implementation, metadata and/or ECC may be written to spare memory area 220 in an operation separate and/or subsequent to an operation of writing information to main memory area 210. In this case, write performance of NAND memory structure 200 may be relatively slow because the time it takes to write twenty bytes of metadata and/or ECC may be as long as the time it takes to write two kilobytes of information, for example. As mentioned above, write operations may be performed on no less than a sector of NAND memory at a time, whether writing to main memory area 210 or spare memory area 220. Another type of nonvolatile memory, however, such as PCM for example, may be written to less than a sector at a time. Accordingly, as discussed in detail below, PCM may be incorporated to store metadata, resulting in improved performance of NAND write operations.

Figure 3:
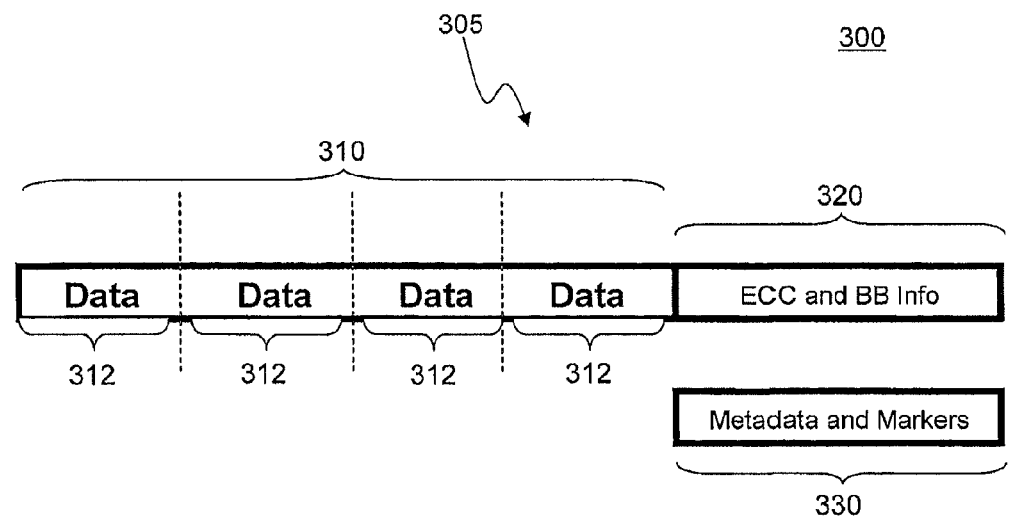
FIG. 3 is a schematic view of a memory structure, according to yet another embodiment.

FIG. 3 is a schematic view of a memory structure 300, according to an embodiment. Memory structure 300 may comprise NAND memory 305 and secondary memory 330, which may comprise PCM or other nonvolatile memory other than NAND memory. For example, NAND memory 160 shown in FIG. 1 may comprise NAND memory 305, though claimed subject matter is not so limited. For illustrative reasons, the embodiment of FIG. 3 will be described so that secondary memory 330 comprises PCM 330. It is understood, however, that any of a number of memory types may be used in place of PCM, and claimed subject matter is not limited in this respect. As described for FIG. 2 above, NAND memory 305 may be partitioned into a main memory area 310 and a spare memory area 320. NAND memory 305 may comprise NAND flash memory. Main memory area 310 and spare memory area 320 may comprise independent addressable spaces that may be accessed by read, and/or write processes, for example. In one implementation, main memory area 310 may comprise one or more sectors 312 of physical memory to store information. For example, as described above for sectors 212 in FIG. 2, such sectors may have a substantially uniform, predefined capacity to store information, though claimed subject matter is not so limited. Spare memory area 320 may be used to store ECC and/or bad block information. In particular, such ECC may be associated with information written to main memory area 310, and bad block information may be descriptive of sectors 312 in NAND memory 305, for example. Meanwhile, metadata (such as that associated with garbage collection and/or wear-leveling for example) associated with information written to main memory area 310 may be written to and maintained in PCM 330. In one implementation, markers may also be written to and maintained in PCM 330. Such markers, which may be generated if information is written to main memory area 310, may comprise invalid block markers, delete sector markers, and/or markers resulting from write commit and/or erase commit to ensure that an erase operation of a particular block is completed, just to name a few examples. Markers may also include write commit, used to ensure that information written is valid during write operations, and invalid block markers to indicate that a particular block contains invalid information.

As mentioned above, such metadata (as well as markers) may have a size of about twenty bytes for every two kilobytes of information (e.g., a size of a sector). In one implementation, metadata and/or markers may be written to PCM 330 in a same operation (e.g., at the same time) that information is written to main memory area 310 of NAND memory 305. On the other hand, in another implementation, metadata and/or markers may be written to PCM 330 in an operation separate and/or subsequent to an operation to write information to main memory area 310. Because small amounts of data (e.g., twenty bytes) may be written to PCM 330 faster than would be the case for writing to NAND spare memory 320, write performance of memory structure 300 may be improved compared to write performance of memory structure 200. As mentioned above, write operations may be performed on no less than a sector of NAND memory 305 at a time, but write operations may be performed a byte at a time in PCM 330, for example. Thus, introducing a secondary memory, such as PCM 330, to memory structure 300 to store metadata may result in improved write performance. Of course, such details of memory structure 300 are merely examples, and claimed subject matter is not so limited.

Figure 4:
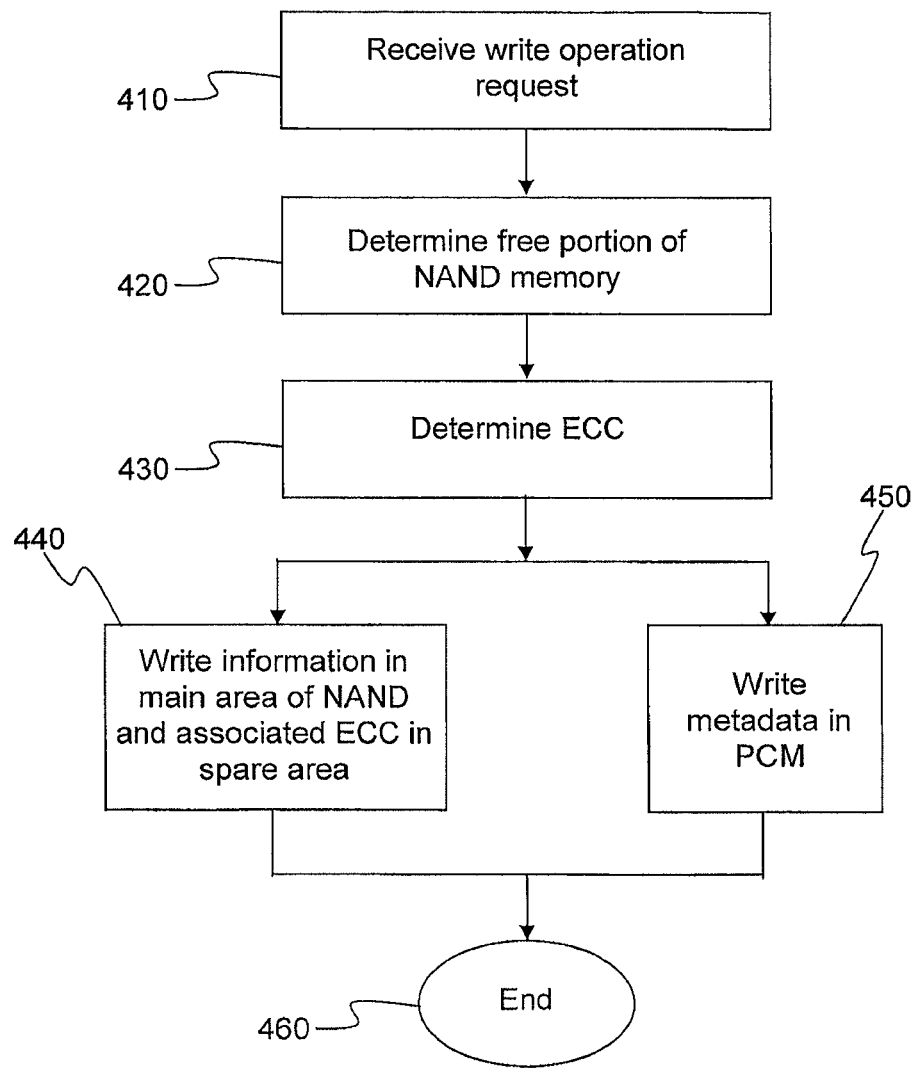
FIG. 4 is a flow diagram of a memory write process, according to an embodiment.

FIG. 4 is a flow diagram of a memory write process 400, according to an embodiment. In one example, memory write process may be performed using memory structure 300 shown in FIG. 3. At block 410, a FTL, such as FTL 110 shown in FIG. 1, for example, may receive a write operation request to write information in NAND memory. Such an FTL may comprise at least a portion of write, erase, read, and/or format processes, for example, which may be performed by a processor, a memory controller, or by a dedicated micro-controller. Such a request, for example, may originate from a processor connected to the FTL. As a result, at block 420, the FTL may determine a free portion of NAND memory in which to write information of the write request. In addition to considering which portions of NAND memory are free, such a determination may be based, at least in part, on wear-leveling and/or bad block information, among other things. At block 430, the FTL may determine ECC for the information to be written to NAND memory. At block 440, such ECC may be written to a spare area of NAND memory while associated information may be written to a main area of NAND memory. In a particular implementation, at block 450, metadata associated with the information being written to NAND memory may be written to PCM in a parallel process. Process 400 may then proceed to oval 460 to end a write process. Of course, details of such a process are merely examples, and claimed subject matter is not so limited.

Figure 5:
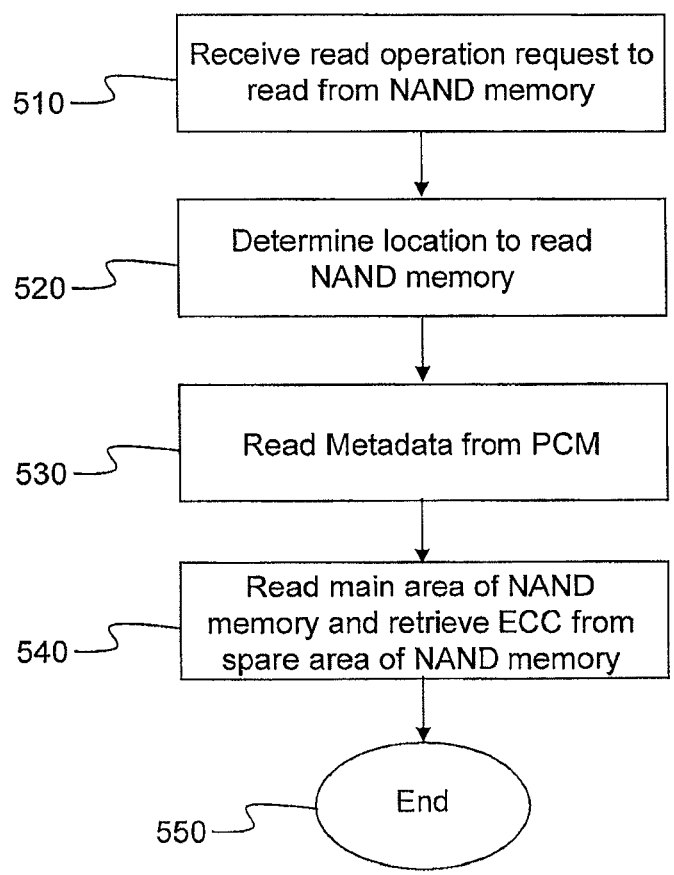
FIG. 5 is a flow diagram of a memory read process, according to an embodiment.

FIG. 5 is a flow diagram of a memory read process 500, according to an embodiment. In one example, memory read process may be performed using memory structure 300 shown in FIG. 3. At block 510, a FTL, such as FTL 110 shown in FIG. 1, for example, may receive a read operation request to read information in NAND memory. Such a request, for example, may originate from a processor operationally connected to the FTL. As a result, at block 520, the FTL may determine a location of NAND memory from where to read information of the read request. Such determining may be based, at least in part, on an address that may accompany a read request. At block 530, the FTL may read metadata from PCM. A location where such metadata is stored may be uniquely associated with the block and page number of an associated read request. Such a location may be calculated starting from a base address in PCM space, depending on the implementation. Of course, such details are merely examples. Other techniques or schema, which may be relatively complex, may be involved to calculate or determine location where metadata may be stored. For example, such schema may involve a variable number of bytes per page and/or additional bytes associated with a block or a set of blocks. In another example, such schema may involve associating different locations to the same page in different statuses or times, though claimed subject matter is not limited in this respect. At block 540, information stored in a main area of NAND memory may be read and ECC associated with the information may be retrieved from a spare area of NAND memory. Process 500 may then proceed to oval 550 to end a read process. Of course, details of such a process are merely examples, and claimed subject matter is not so limited.

Figure 6:
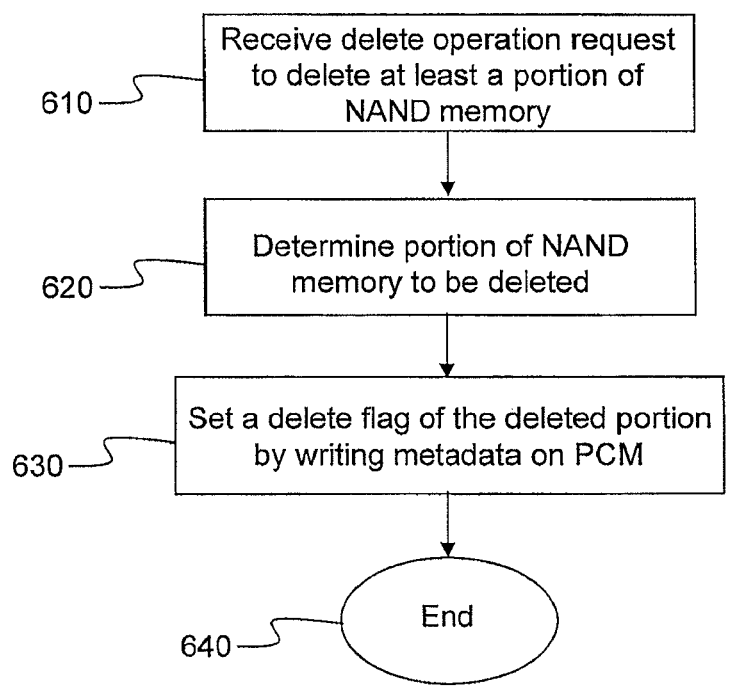
FIG. 6 is a flow diagram of a memory delete process, according to an embodiment.

FIG. 6 is a flow diagram of a memory delete process 600, according to an embodiment. In one example, memory delete process may be performed using memory structure 300 shown in FIG. 3. At block 610, a FTL, such as FTL 110 shown in FIG. 1, for example, may receive a delete operation request to delete information in NAND memory. Such a request, for example, may originate from a processor operationally connected to the FTL. As a result, at block 620, the FTL may determine a location of NAND memory from where to delete information of the delete request. Such determining may be based, at least in part, on an address that may accompany a delete request. At block 630, the FTL may set a delete flag or perform another process to indicate that a particular portion of NAND memory has been deleted. Such a delete flag, for example, may be written as metadata in PCM. Process 600 may then proceed to oval 640 to end a delete process. Of course, details of such a process are merely examples, and claimed subject matter is not so limited.

Figure 7:
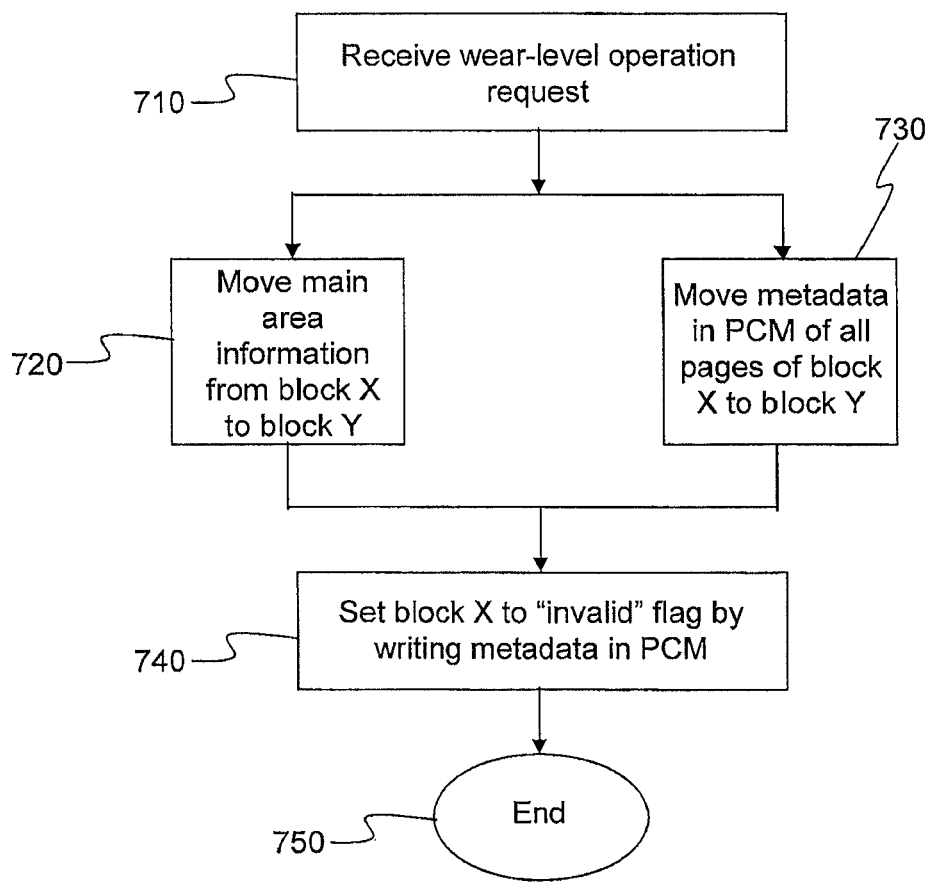
FIG. 7 is a flow diagram of a memory wear-level process, according to an embodiment.

FIG. 7 is a flow diagram of a memory wear-level process 700, according to an embodiment. Such a process may lead to substantially uniform usage of physical blocks in a NAND memory. At block 710, a FTL, such as FTL 110 shown in FIG. 1, for example, may receive a wear-level operation request from a processor operationally connected to the FTL. In another implementation, FTL may initiate a wear-level process from time to time or on a scheduled basis, and claimed subject matter is not limited in this respect. Such a process may include relocating data stored in an initial portion of memory to another portion of memory. Accordingly, FTL may modify an address that identifies the initial portion of memory to an address that identifies the new portion of memory to contain the relocated data. In particular wear-level process 700, a memory block X of information stored in a main area of NAND memory may be moved to a memory block Y in the main area of NAND memory, for example, as at block 720. Metadata associated with the information moved from memory block X may be stored in PCM, as discussed above. At block 730, such metadata may be moved from its present location in the PCM to another location in the PCM that corresponds to memory block Y. In one implementation, operations to write to the PCM may be performed to store new information mapping between a NAND memory and PCM locations. In one implementation of wear-level process 700, moving memory blocks of information in NAND and moving metadata associated with the information may be performed in parallel processes (e.g., performed at the same time), though claimed subject matter is not so limited. At block 740, FTL may set a particular flag to indicate that memory block X is "invalid" so that the FTL may avoid writing new information to memory block X, at least for a particular time, for example. Such a flag may also indicate that memory block X no longer stores valid information. Such a flag may be written to and maintained by the PCM. As discussed above, relatively small amounts of data, such as a flag, may be written to PCM, whereas writing to NAND memory may be performed in no less than sectors of data. Accordingly, performance of NAND memory may be improved (e.g., time may be saved) by writing a flag to PCM instead of the NAND memory. Process 700 may then proceed to oval 750 to end a wear-level process. Of course, details of such a process are merely examples, and claimed subject matter is not so limited.

Figure 8:
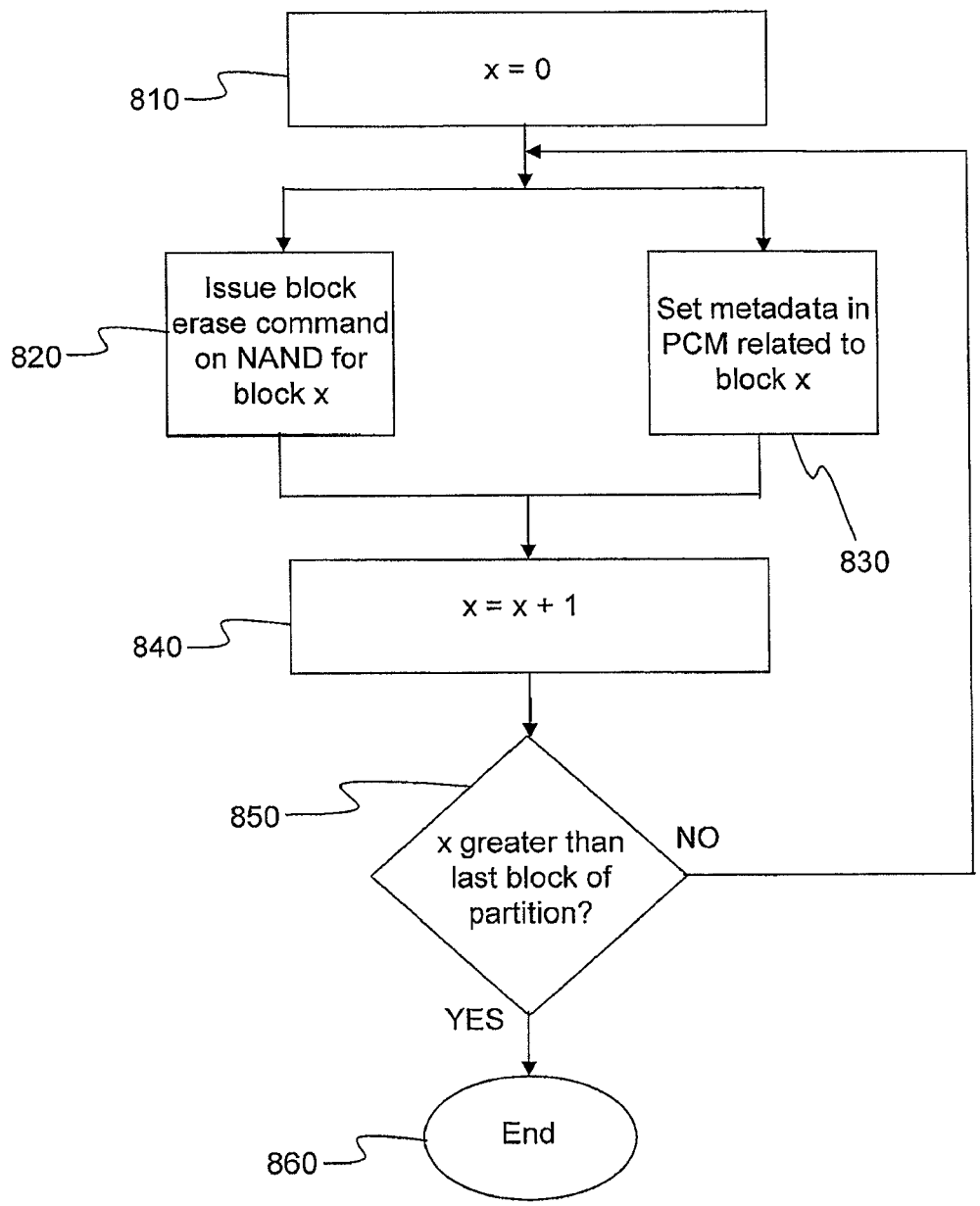
FIG. 8 is a flow diagram of a memory format process, according to an embodiment.

FIG. 8 is a flow diagram of a memory format process 800, according to an embodiment. For example, FTL may perform such a process to erase all blocks or a contiguous area of memory in a NAND memory sequentially one block at a time. At block 810, a counter x may be initially set to the number of the first block in the area to be erased, such as zero in the case described in process 800. At block 820, FTL may perform an operation to erase the $x^{th}$ block of NAND memory. If x comprises the initial value zero, such a block may be the first block of a memory device to be erased. In one implementation, in a parallel process, at block 830, metadata associated with the x-numbered block in the NAND memory may be generated and written to PCM. In an example, such metadata may comprise the number of erases performed on a given block. As mentioned above for process 700, relatively small amounts of data, such as metadata, may be written to PCM, whereas writing to NAND memory may be performed in no less than blocks of data. Accordingly, performance of NAND memory may be improved (e.g., time may be saved) by writing metadata to PCM instead of the NAND memory. At block 840, counter x may be incremented to a subsequent value. At diamond 850, if counter x is greater than the number of blocks to be erased, then process 800 may end at oval 860. On the other hand, if counter x is less than the number of blocks to be erased, then process 800 may return to blocks 820 and 830 to erase the x-numbered block in the NAND memory and to generate metadata associated with the x-numbered block. Of course, details of such a process are merely examples, and claimed subject matter is not so limited.

Figure 9:
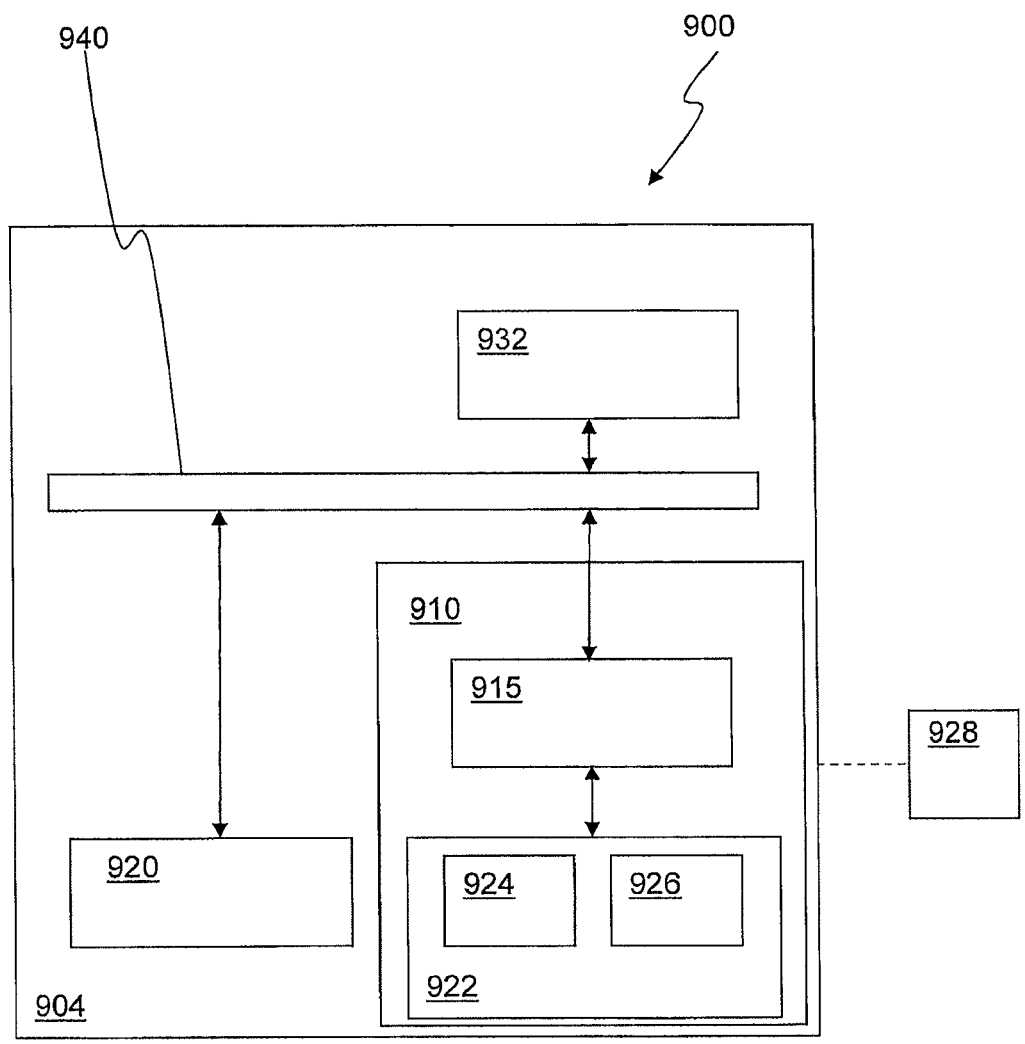
FIG. 9 is a schematic block diagram of a computing system and a memory device, according to an embodiment.

FIG. 9 is a schematic diagram illustrating an exemplary embodiment of a computing system 900 including a memory device 910. Such a computing device may comprise one or more processors, for example, to execute an application and/or other code. A computing device 904 may be representative of any device, appliance, or machine that may be configurable to manage memory device 910. Memory device 910 may include a memory controller 915 and a memory 922. By way of example but not limitation, computing device 904 may include: one or more computing devices and/or platforms, such as, e.g., a desktop computer, a laptop computer, a workstation, a server device, or the like; one or more personal computing or communication devices or appliances, such as, e.g., a personal digital assistant, mobile communication device, or the like; a computing system and/or associated service provider capability, such as, e.g., a database or data storage service provider/system; and/or any combination thereof.

It is recognized that all or part of the various devices shown in system 900, and the processes and methods as further described herein, may be implemented using or otherwise including hardware, firmware, software, or any combination thereof. Thus, by way of example but not limitation, computing device 904 may include at least one processing unit 920 that is operatively coupled to memory 922 through a bus 940 and a host or memory controller 915. Processing unit 920 is representative of one or more circuits configurable to perform at least a portion of a data computing procedure or process. By way of example but not limitation, processing unit 920 may include one or more processors, controllers, microprocessors, microcontrollers, application specific integrated circuits, digital signal processors, programmable logic devices, field programmable gate arrays, and the like, or any combination thereof. Processing unit 920 may include an operating system configured to communicate with memory controller 915. Such an operating system may, for example, generate commands to be sent to memory controller 915 over bus 940. In one implementation, memory controller 915 may comprise an internal memory controller or an internal write state machine, wherein an external memory controller (not shown) may be external to memory device 910 and may act as an interface between the system processor and the memory itself, for example. Such commands may comprise read and/or write commands.

Memory 910 is representative of any data storage mechanism. In an implementation, memory 922 may include primary memory 924 and/or a secondary memory 926. Primary memory 924 may comprise NAND, for example, while secondary memory 926 may comprise a PCM. While illustrated in this example as being separate from processing unit 920, it should be understood that all or part of primary memory 924 may be provided within or otherwise co-located/coupled with processing unit 920.

In one embodiment, computing system 900 may comprise a memory device that includes an array of NAND memory cells and a FTL to receive a write request to store information in the array of NAND memory cells, determine metadata of the information, write the information in the array of NAND memory cells, and write the metadata in a nonvolatile memory other than the NAND memory array. Such other nonvolatile memory may comprise PCM, for example. System 900 may further include processor 920 to host one or more applications and to initiate the write request to the flash translation layer to provide access to the NAND memory cells in the memory device.

Secondary memory 926 may include, for example, the same or similar type of memory as primary memory and/or one or more data storage devices or systems, such as, for example, a disk drive, an optical disc drive, a tape drive, a solid state memory drive, etc. In certain implementations, secondary memory 926 may be operatively receptive of, or otherwise configurable to couple to, a computer-readable medium 928. Computer-readable medium 928 may include, for example, any medium that can carry and/or make accessible data, code, and/or instructions for one or more of the devices in system 900.

Computing device 904 may include, for example, an input/output 932. Input/output 932 is representative of one or more devices or features that may be configurable to accept or otherwise introduce human and/or machine inputs, and/or one or more devices or features that may be configurable to deliver or otherwise provide for human and/or machine outputs. By way of example but not limitation, input/output device 932 may include an operatively configured display, speaker, keyboard, mouse, trackball, touch screen, data port, etc.

In the above description, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

In the above description of various memories, one or more portions of such memories may store digital signals representative of data and/or information as expressed by a particular state of the memories. For example, an electronic signal representative of data and/or information may be "stored" in a portion of memory device by affecting or changing the state of such portions of memories to represent data and/or information as binary information (e.g., ones and zeros). As such, in a particular implementation, such a change of state of the portion of memory to store a signal representative of data and/or information constitutes a transformation of memories to a different state or thing. Of course, details of such memories are merely examples, and claimed subject matter is not so limited.

The terms, "and," "and/or," and "or" as used herein may include a variety of meanings that will depend at least in part upon the context in which it is used. Typically, "and/or" as well as "or" if used to associate a list, such as A, B or C, is intended to mean A, B, and C, here used in the inclusive sense, as well as A, B or C, here used in the exclusive sense. Reference throughout this specification to "one embodiment" or "an embodiment" means that a particular feature, structure, or characteristic described in connection with the embodiment is included in at least one embodiment of claimed subject matter. Thus, the appearances of the phrase "in one embodiment" or "an embodiment" in various places throughout this specification are not necessarily all referring to the same embodiment. Furthermore, the particular features, structures, or characteristics may be combined in one or more embodiments. Embodiments described herein may include machines, devices, engines, or apparatuses that operate using digital signals. Such signals may comprise electronic signals, optical signals, electromagnetic signals, or any form of energy that provides information between locations.

While there has been illustrated and described what are presently considered to be example embodiments, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

What is claimed is:

1. A method comprising:
responding to a wear-level operation request by:
copying data from a first portion of a first memory array to a second portion of the first memory array, wherein the first memory array comprises a NAND or NAND-based memory array; and
copying metadata associated with the data from a third portion of a second memory array to a fourth portion of the second memory array, wherein the second memory array comprises non-volatile memory comprising at least one of the group consisting of: phase-change memory, EEPROM, and NOR flash memory.

2. The method of claim 1, wherein said copying data and copying metadata are performed in parallel with one another.

3. The method of claim 1, wherein the wear-level operation request is received by a flash translation layer from a processor operationally connected to the flash translation layer.

4. The method of claim 1, wherein the wear-level operation request is initiated by a flash translation layer.

5. The method of claim 1, wherein said copying data comprises modifying an address from identifying the first portion of the first memory array to identifying the second portion of the first memory array.

6. The method of claim 1, wherein said copying data comprises copying information from a first memory block of the first memory array to a second memory block of the first memory array.

7. The method of claim 6, wherein the first memory block and the second memory block are both in a main area of the first memory array.

8. The method of claim 1, wherein said copying metadata comprises copying the metadata from a third memory block of the second memory array to a fourth memory block of the second memory array.

9. The method of claim 1, wherein the metadata comprises sector numbers, virtual block addresses, or both, of the NAND or NAND-based memory array.

10. The method of claim 1, further comprising setting a flag to indicate that the first portion of the first memory array is invalid, to indicate that the first portion of the first memory array no longer stores valid data, or both.

11. The method of claim 10, wherein the flag is stored in the second memory array.

12. A memory device comprising:
a NAND or NAND-based memory array;
a nonvolatile memory comprising at least one of the group consisting of: phase-change memory, EEPROM, and NOR flash memory; and
a flash translation layer configured to respond to a wear-level operation request by:
copying data from a first portion of the NAND or NAND-based memory array to a second portion of the NAND or NAND-based memory array; and
copying metadata associated with the data from a third portion of the nonvolatile memory to a fourth portion of the nonvolatile memory.

13. The memory device of claim 12, wherein said copying data and copying metadata are performed in parallel with one another.

14. The memory device of claim 12, wherein the flash translation layer comprises a NAND driver and a PCM driver.

15. The memory device of claim 12, wherein the metadata comprises sector numbers, virtual block addresses, or both, of the NAND or NAND-based memory array.

16. The memory device of claim 12, wherein the flash translation layer comprises a wear-leveling module configured to monitor and evenly distribute a number of erase cycles per block of memory of the NAND or NAND-based memory array.

17. The memory device of claim 12, wherein the first portion of the NAND or NAND-based memory array and the second portion of the NAND or NAND-based memory array are both in a main area of the NAND or NAND-based memory array.

18. The memory device of claim 12, wherein the flash translation layer is further configured to set a flag to indicate that the first portion of the NAND or NAND-based memory array is invalid, to indicate that the first portion of the NAND or NAND-based memory array no longer stores valid data, or both.

19. The memory device of claim 18, wherein the flag is stored in the nonvolatile memory.

20. A system comprising:
a computer processor; and
a memory device operationally coupled to the computer processor, the memory device comprising:
a NAND or NAND-based memory array;
a nonvolatile memory comprising at least one of the group consisting of: phase-change memory, EEPROM, and NOR flash memory; and
a flash translation layer configured to respond to a wear-level operation request by;
moving data from a first portion of the NAND or NAND-based memory array to a second portion of the NAND or NAND-based memory array; and
moving metadata associated with the data from a third portion of the nonvolatile memory to a fourth portion of the nonvolatile memory.

21. The system of claim 20, wherein said moving data and moving metadata are performed in parallel with one another.

22. The system of claim 20, wherein the wear-level operation request is received by the flash translation layer from the computer processor.

23. The system of claim 20, wherein the wear-level operation request is initiated by the flash translation layer.

24. The system of claim 20, wherein said moving data comprises modifying an address from identifying the first portion of the NAND or NAND-based memory array to identifying the second portion of the NAND or NAND-based memory array.

25. The system of claim 20, wherein said moving data comprises moving information from a first memory block of the NAND or NAND-based memory array to a second memory block of the NAND or NAND-based memory array.

26. The system of claim 25, wherein the first memory block and the second memory block are both in a main area of the NAND or NAND-based memory array.

27. The system of claim 20, wherein said moving metadata comprises moving the metadata from a third memory block of the nonvolatile memory to a fourth memory block of the nonvolatile memory.

28. The system of claim 20, wherein the flash translation layer is further configured to set a flag to indicate that the first portion of the NAND or NAND-based memory array is invalid, to indicate that the first portion of the NAND or NAND-based memory array no longer stores valid data, or both.

* * * * *